F. A. STRONG.
CHAIN TOOL.
APPLICATION FILED JAN. 2, 1913.
1,069,041.
Patented July 29, 1913.
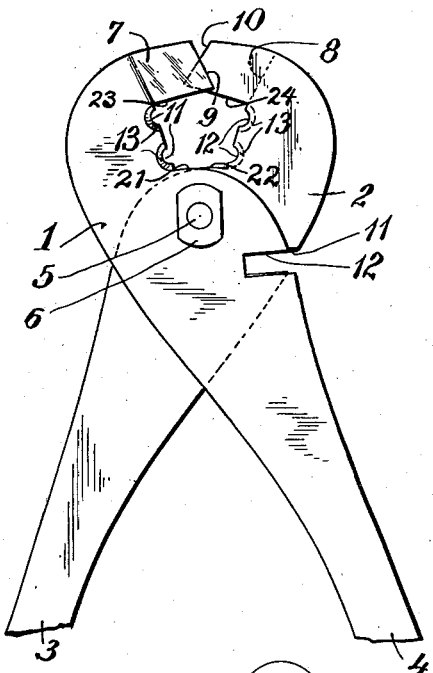
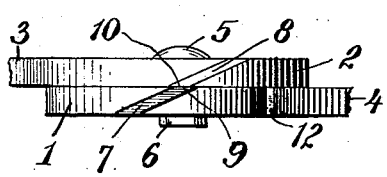
WITNESSES
INVENTOR
Frederick A. Strong
BY
Duncan & Duncan ATTORNEYS

UNITED STATES PATENT OFFICE.

FREDERICK A. STRONG, OF BRIDGEPORT, CONNECTICUT, ASSIGNOR TO WEED CHAIN TIRE GRIP COMPANY, OF NEW YORK, N. Y., A CORPORATION OF NEW YORK.

CHAIN-TOOL.

1,069,041.  Specification of Letters Patent.  Patented July 29, 1913.

Application filed January 2, 1913. Serial No. 739,828.

*To all whom it may concern:*

Be it known that I, FREDERICK A. STRONG, a citizen of the United States, and resident of Bridgeport, Fairfield county, Connecticut, have made a certain new and useful Invention Relating to Chain-Tools, of which the following is a specification, taken in connection with the accompanying drawing, which forms part of the same.
This invention relates especially to tools for the construction or repair of chain tire grips, although, of course adapted for use in connection with other chain or wire devices where it is desirable to cut, open and close links or the like.

In the accompanying drawing showing in a somewhat diagrammatic way an illustrative embodiment of this invention, Figure 1 is an elevation of the tool in its substantially open condition; Fig. 2 is an end view thereof. Fig. 3 shows the tool acting as a hook opener; and Fig. 4 shows its action in closing a tread chain attaching hook.

As shown in the illustrative embodiment of the invention indicated in the drawing the tool may comprise two closing jaws 1 and 2 which may have operating handles of any desired description such as the integral handles 3, 4, each jaw and connected handle being preferably formed of sheet steel of substantially uniform thickness and practically flat throughout, except that if desired the end of each handle may be bent somewhat into the plane of the other handle so as to positively prevent undesirable inward movement. In this way the parts of the tool may at a minimum of expense be very readily stamped out of sheets of tool steel or other suitable material, the jaws being preferably given ample area adjacent their pivotal connection so as to secure in this way the desired degree of alinement without the necessity of accurate fitting. The pivotal connection of the jaws may be conveniently secured by an ordinary pivot or bolt 5 having the nut 6 which also serves to hold the jaws substantially in alinement under operating conditions. The jaws may be provided with suitable coöperating opening and closing devices adapted to open the attaching hooks of chain grips of the Weed-Parsons type, for instance, and to close down on the side chains the attaching hooks used to secure in position the tread members, it being also desirable to have a suitable cutting device for detaching unnecessary lengths of side chain and for other purposes in connection with the construction or repair of these grips.

The opening device may with advantage comprise lapping, wedging opening jaws having a scissors action so as to wedge themselves between the ends of the attaching hooks and the body portions thereof and open these hooks to the desired extent. For this purpose the closing jaws 1, 2 may be provided adjacent their ends with lapping, wedging, opening jaws 7, 8 which may be formed with inclined ends 9, 10 so as to provide coöperating lapping points on the side adjacent the pivot. As seen in Fig. 2, these wedging jaws may with advantage be beveled at an angle of twenty to thirty degrees or so to the flat meeting faces of the closing jaws so as to exert the proper wedging action on the connecting hooks, such as 14, as indicated in Fig. 3. In opening an attaching hook the connected link 16 of the side chain is preferably arranged below the wedging jaws which are then entered below the ends 17 of the attaching hook and when these wedging jaws are forced together by the connected handles the ends of this hook are wedged away from the body portion thereof so as to open the hook sufficiently to allow it to be withdrawn from the link 16 of the side chain so as to disconnect the tread chain member 15 therefrom.

The closing device is preferably provided with gripping sockets having sufficient bevel to grip and aline the ends and body of the usual doubled attaching hook, for instance, lateral retainers preferably comprising wedging retainers being also provided in coöperation therewith so as to positively prevent any part of the hook from getting out of lateral alinement during the closing operation. This closing device may be conveniently formed by providing in the closing jaws 1, 2 preferably closely adjacent their connected pivot suitable gripping sockets 11, 12 to accommodate parts of the attaching hook, these sockets being preferably formed with the bevels 13 of just sufficient angle to grip the parts of the hook with which they come in contact and prevent them slipping longitudinally with respect to the jaws. These jaws are also preferably formed with lateral retainers, such as 21, 22, which limit the lateral movement of the hook members in that direction while the other lateral retainers 23, 24 are preferably somewhat outwardly inclined as indicated in the drawing, so that they have a positive wedging action as the jaws come together forcing inward any part of the hook which tends to move out of lateral alinement. These wedging lateral retainers are as indicated formed in this instance by the inner faces of the scissors action closing jaws which because of their inclined wedge shape are enabled to more readily enter and wedge apart a closed hook of this character. In this way these opening jaws have a desirable double function by positively wedging or forcing laterally into alinement any part of the hook which tends to get out of alinement while the hook is being forced together in the other direction during the closing operation.

The closing operation is indicated in Fig. 4 showing how the attaching hook may be inserted within the closing device which may engage the hook adjacent its ends 17. When the closing jaws are forced together by the handles the hook ends and body portions 14 are held in the gripping notches against undesirable movement and forced into closed position, securely attaching the chain tread member 15 to the links 16 of the side chain.

The cutting device may comprise coöperating cutter notches 11, 12 formed in the closing jaws adjacent the pivot so as to accommodate the side chain links and detach the desired number thereof from the grips.

This invention has been described in connection with a number of illustrative embodiments, forms, proportions, sizes, materials and arrangements of parts, to the details of which disclosure this invention is not of course to be limited, since

What is claimed as new and what is desired to be secured by Letters Patent is set forth in the appended claims:

1. In chain tools adapted for use in opening or closing chain tire grips and so forth, substantially flat closing jaws each having a handle, a pivot connecting said jaws and holding their coöperating faces in substantial alinement under operating conditions, said jaws being formed with a scissors action opening device comprising lapping wedging opening jaws having inclined edges forming lapping points, said jaws being formed with a closing device adjacent said pivot and comprising sockets adapted to accommodate an article.

2. In chain tools adapted for use in opening or closing chain tire grips and so forth, substantially flat closing jaws each having an integral handle stamped from sheet metal of substantially the same thickness throughout practically its entire extent, a pivot connecting said closing jaws and holding their coöperating faces in substantial alinement under operating conditions, said closing jaws being formed with a closing device adjacent said pivot and comprising two gripping sockets formed in each jaw adapted to accommodate a doubled attaching hook, and lateral retainers adjacent said sockets and comprising a wedging lateral retainer to positively bring the adjacent parts of said hook into lateral alinement during the closing operation.

3. In chain tools adapted for use in opening or closing chain tire grips and so forth, substantially flat closing jaws each having a handle, a pivot connecting said closing jaws and holding their coöperating faces in substantial alinement under operating conditions, said closing jaws being formed with a closing device comprising sockets formed in each jaw adapted to accommodate a doubled attaching hook, and lateral retainers adjacent said sockets and comprising a wedging lateral retainer to positively bring the adjacent parts of said hook into lateral alinement during the closing operation.

4. In chain tools adapted for use in opening or closing chain tire grips and so forth, closing jaws each having a handle, a pivot connecting said closing jaws comprising sockets formed in each jaw adapted to accommodate a doubled attaching hook, and lateral retainers adjacent said sockets tending to hold the adjacent parts of said hook in lateral alinement during the closing operation.

5. In chain tools adapted for use in opening or closing chain tire grips and so forth, substantially flat closing jaws each having an integral handle, a pivot connecting said closing jaws and holding their coöperating faces in substantial alinement under operating conditions, said closing jaws being formed with a closing device comprising gripping sockets adapted to accommodate an article and lateral retainers adjacent said sockets and comprising wedge shaped members having their inner sides outwardly inclined to form wedging lateral retainers to positively bring the adjacent parts of said article into lateral alinement during the closing operation.

6. In chain tools adapted for use in closing chain tire grips and so forth, closing jaws each having a handle, a pivot connecting said closing jaws, said closing jaws being formed with a closing device comprising gripping sockets adapted to accommodate an article and lateral retainers adjacent said sockets and comprising members having their inner sides outwardly inclined to form wedging lateral retainers to positively bring the adjacent parts of said article into lateral alinement during the closing operation.

7. In chain tools adapted for use in closing chain tire grips and so forth, closing jaws each having a handle, a pivot connecting said closing jaws, said closing jaws being formed with a closing device comprising lateral retainers adjacent said sockets and comprising an outwardly inclined retainer member to positively bring the adjacent parts of said article into lateral alinement during the closing operation.

8. In chain tools adapted for use in opening or closing chain tire grips and so forth, substantially flat jaws each having an integral handle and of substantially the same thickness throughout practically its entire extent, a pivot connecting said jaws and holding their coöperating faces in substantial alinement under operating conditions, said jaws being formed with a closing device, and with a scissors action opening device comprising lapping wedging opening jaws having inclined edges forming lapping points on the sides adjacent said pivot, said wedging jaws being beveled at angles between about twenty and thirty degrees with the meeting plane of said jaws to enable said lapping opening jaws to crowd between members and wedge them apart.

9. In chain tools adapted for use in opening or closing chain tire grips and so forth, jaws each having a handle, a pivot connecting said jaws and holding their coöperating faces in substantial alinement under operating conditions, said jaws being formed with a scissors action opening device comprising lapping wedging opening jaws having inclined edges forming lapping points, said wedging jaws being beveled at angles between about twenty and thirty degrees to enable said lapping opening jaws to crowd between members and wedge them apart.

10. In chain tools adapted for use in opening or closing chain tire grips and so forth, substantially flat jaws each having a handle, a pivot connecting said jaws, said jaws being formed with a closing device, and with a scissors action opening device comprising lapping wedging opening jaws to crowd between members and wedge them apart.

11. In chain tools adapted for use in opening or closing chain tire grips and so forth, substantially flat jaws each having an integral handle, a pivot connection between said jaws, said jaws being formed with a closing device, and with a scissors action opening device comprising lapping wedging opening jaws having flat coöperating faces and beveled at angles between about twenty and thirty degrees with the plane of the coöperating faces of said jaws to enable said lapping opening jaws to crowd between members and wedge them apart.

12. In chain tools adapted for use in opening or closing chain tire grips and so forth, substantially flat jaws each having a handle, a pivot connection between said jaws, said jaws being formed with a scissors action opening device comprising lapping wedging opening jaws having flat coöperating faces and beveled at small angles with the plane of the coöperating faces of said jaws to enable said lapping opening jaws to crowd between members and wedge them apart.

FREDERICK A. STRONG.

Witnesses:
E. J. MORRELL,
WALTER F. WALKER.